(12) United States Patent
Toyama et al.

(10) Patent No.: US 10,211,730 B2
(45) Date of Patent: Feb. 19, 2019

(54) DC-DC CONVERTER

(71) Applicant: KABUSHIKI KAISHA TOSHIBA, Minato-ku (JP)

(72) Inventors: Yosuke Toyama, Kawasaki (JP); Taichi Ogawa, Inagi (JP); Takeshi Ueno, Kawasaki (JP); Tetsuro Itakura, Nerima (JP); Osamu Watanabe, Chigasaki (JP); Takayuki Miyazaki, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/393,514

(22) Filed: Dec. 29, 2016

(65) Prior Publication Data
US 2017/0237346 A1 Aug. 17, 2017

(30) Foreign Application Priority Data
Feb. 15, 2016 (JP) .................. 2016-026003

(51) Int. Cl.
*G05F 1/577* (2006.01)
*H02M 3/158* (2006.01)
*H02M 3/157* (2006.01)
*H02M 1/08* (2006.01)
*H02M 1/00* (2006.01)

(52) U.S. Cl.
CPC ............. *H02M 3/157* (2013.01); *H02M 1/08* (2013.01); *H02M 3/158* (2013.01); *H02M 2001/009* (2013.01); *H02M 2001/0009* (2013.01)

(58) Field of Classification Search
CPC . H02M 2001/0006; H02M 2001/0009; H02M 3/158; H02M 2001/008; G05F 1/577
See application file for complete search history.

(56) References Cited

U.S. PATENT DOCUMENTS 7,378,823 B2 * 5/2008 Yamanaka ................ H02J 1/08
323/222
8,427,121 B2 * 4/2013 Notman .............. H02M 3/1588
323/267

(Continued)

FOREIGN PATENT DOCUMENTS

| JP | 2001-514840 A | 9/2001 |
| JP | 2007-295736 A | 11/2007 |
| JP | 2011-61953 A | 3/2011 |

*Primary Examiner* — Gary L Laxton
(74) *Attorney, Agent, or Firm* — Oblon, McClelland, Maier & Neustadt, L.L.P.

(57) ABSTRACT

A DC-DC converter includes an input terminal, multiple output terminals, an inductor, a first switch, a first condenser, a second switch and a switch controller. One end of the inductor is connected to the input terminal. The first switch is subjected to on-off control to change a current flowing through the inductor. The first condenser has one end connected between the inductor and a first output terminal, which is one of the multiple output terminals, and has the other end connected to a ground. The second switch is connected between the inductor and the first condenser. The switch controller controls the second switch to turn on when the first switch is turned off while a first output voltage from the first output terminal is smaller than a predetermined first threshold value.

9 Claims, 9 Drawing Sheets

(56) References Cited

U.S. PATENT DOCUMENTS

| | | | | |
|---|---|---|---|---|
| 2002/0093315 A1* | 7/2002 | Sluijs | ............... | H02M 3/158 |
| | | | | 323/267 |
| 2006/0176031 A1* | 8/2006 | Forman | ............ | H02M 3/158 |
| | | | | 323/267 |
| 2006/0232253 A1* | 10/2006 | Salato | ............... | H02M 1/36 |
| | | | | 323/225 |
| 2009/0256534 A1* | 10/2009 | Videtich | ........... | H02M 3/156 |
| | | | | 323/235 |

* cited by examiner

DC-DC CONVERTER

CROSS-REFERENCE TO RELATED APPLICATION(S)

This application is based upon and claims the benefit of priority from Japanese Patent Application No. 2016-026003, filed Feb. 15, 2016; the entire contents of which are incorporated herein by reference.

FIELD

Embodiments described herein relate generally to a DC-DC converter.

BACKGROUND

A multi-output DC-DC converter supplies a current to multiple output destinations in predetermined order by predetermined number of times. The output destination is determined by time sharing control that turns on any one of switches respectively connected to the multiple output destinations at a predetermined period. Moreover, each output can be suspended at optional timing based on a control signal from the outside. However, when one of the outputs is suspended based on the control signal, the current is not supplied to any output destination during the period in which the suspended output would output a current under normal circumstances.

Moreover, when the multi-output DC-DC converter uses one of the outputs as a power source for a control circuit thereof, there is a problem that an entire circuit is suspended when the output power to the control circuit is reduced and the control circuit is suspended. To deal with the problem, there is known a method in which a circuit that suspends all other outputs, when a voltage of output used as a power source for a control circuit falls to a threshold value or less, is added. However, in the time sharing control, the time allocated to each output is not changed, and thereby, waiting time occurs before that power supply to the required output destination is started. Therefore, it takes time to recover the output voltage to the control circuit. In this way, there is a problem of inefficiency that, even though other outputs are suspended, it takes time to start power supply to an output destination to be given priority.

DETAILED DESCRIPTION

A DC-DC converter as embodiments of the present invention includes an input terminal, multiple output terminals, an inductor, a first switch, a first condenser, a second switch and a switch controller.

To the input terminal, input voltage is input.

From the output terminals, output voltage is output.

One end of the inductor is connected to the input terminal.

The first switch is subjected to on-off control, to thereby change the current flowing into the inductor.

One end of the first condenser is connected to somewhere between the inductor and a first output terminal, which is one of the multiple output terminals, and the other end is connected to a ground.

The second switch is connected to somewhere between the inductor and the first condenser.

The switch controller controls to turn on the second switch when the first switch is turned off while a first output voltage from the first output terminal is smaller than a predetermined first threshold value.

The present embodiments reduce the time required for power to supply to the output destination that is given priority in the multi-output DC-DC converter.

Below, a description is given of embodiments of the present invention with reference to the drawings. The present invention is not limited to the embodiments.

First Embodiment

Figure 1:
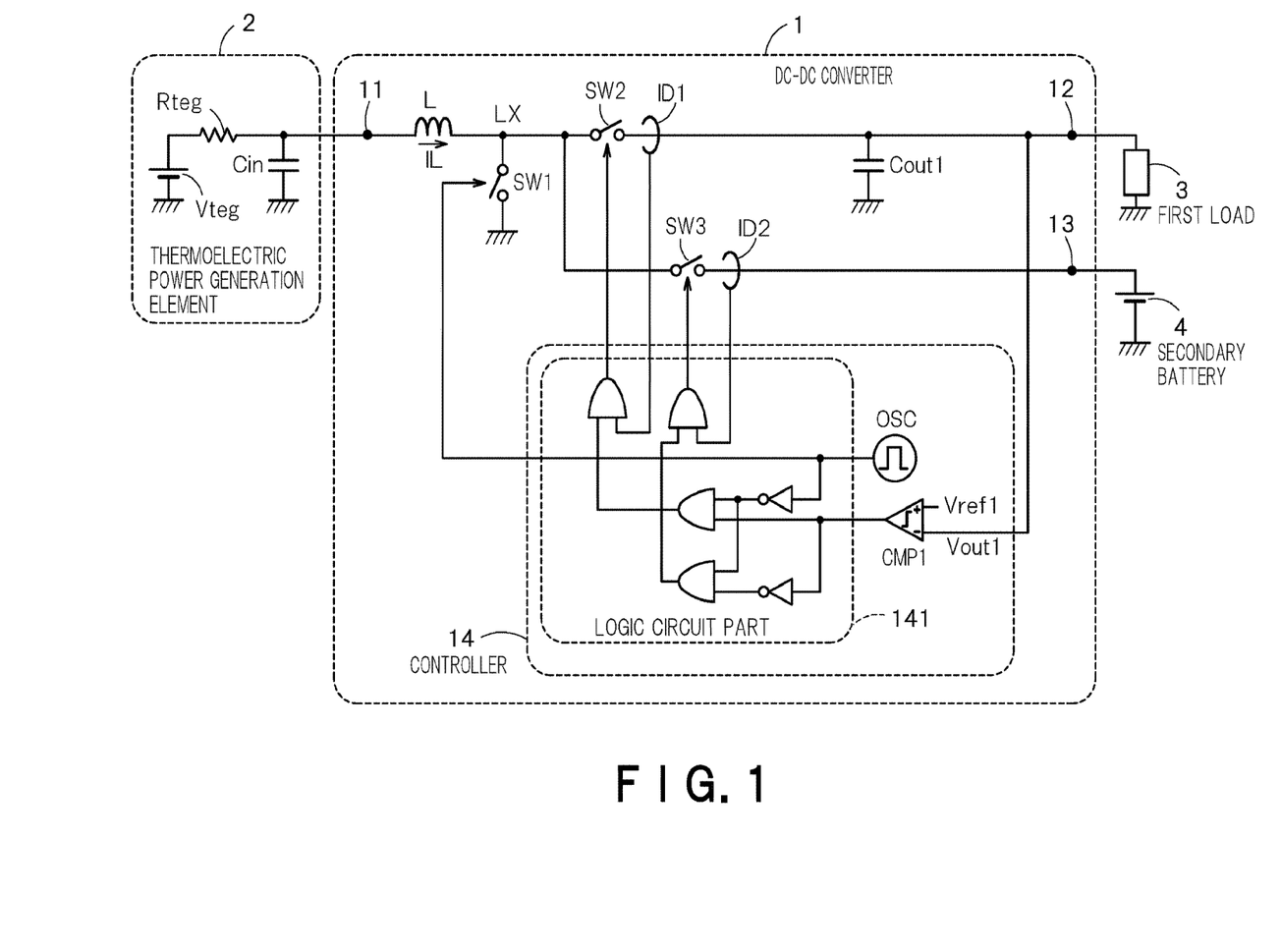
FIG. 1 is a diagram showing an example of a circuit configuration including a DC-DC converter related to a first embodiment.

FIG. 1 is a diagram showing an example of a circuit configuration including a DC-DC converter related to the first embodiment. There is shown a circuit diagram of a thermoelectric power generation device (power source device) configured with a DC-DC converter 1 related to the first embodiment and a thermoelectric power generation element 2. The DC-DC converter 1 related to the first embodiment includes an input terminal 11, a first output terminal 12, a second output terminal 13, an inductor L, a first switch SW1, a second switch SW2, a third switch SW3, a condenser Cout1, two current detection circuits ID1 and ID2, and a controller (switch controller) 14.

The controller 14 includes an oscillator OSC, a comparator CMP1 and a logic circuit part 141. The logic circuit part 141 is assumed to be configured to perform on-off control of switches (switching) of the first switch SW1, the second switch SW2 and the third switch SW3 by processing the outputs from the oscillator OSC and the comparator CMP1. In FIG. 1, desired switch control is achieved by four AND circuits (AND gates) and two NOT circuits (inverters).

Note that the configuration of the DC-DC converter 1 shown in the figure is merely an example, and the DC-DC converter 1 may have a different configuration or may include not-shown components. For example, the current detection circuits ID1 and ID2 are used for preventing backflow of current; however, other components that prevent the backflow of current may be used. Alternatively, for example, as long as the switching control performed by the first embodiment can be achieved, the configuration of the logic circuit part 141 provided to the controller 14 may be determined optionally.

The thermoelectric power generation element 2 is a thermoelectric power generation device modeled by an electromotive force Vteg and an output resistance. Rteg. The electromotive force Vteg is proportional to a difference in temperature between a high-temperature side member and a low-temperature side member constituting the thermoelectric power generation element 2. For example, at the difference in temperature of the order of several degrees Celsius, in general, the electromotive force Vteg becomes several tens of mV to several hundreds of mV. Moreover, the output resistance Rteg is an almost constant value regardless of the temperature, and is a value of the order of several ohms to several hundreds of ohms. The output voltage Vout of the thermoelectric power generation element 2 is smoothed by the input capacitance Cin of the converter, and accordingly, also serves as the input voltage Vin of the DC-DC converter 1. An ordinary electronic circuit operates at the power source voltage of 1V or more. Therefore, in general, a thermoelectric power generation element and a step-up DC-DC converter are used in combination. Note that as long as the electromotive force is small, the power generation element may not be configured with the thermoelectric power generation element.

Next, each component constituting the DC-DC converter 1 will be described.

The input terminal 11 of the DC-DC converter 1 is connected to the thermoelectric power generation element 2, and the input voltage Vin is input thereto. The first output terminal 12 is connected to a first load 3 and outputs (supplies) a first output voltage Vout1. The second output terminal 13 is connected to a secondary battery 4 and outputs (supplies) a second output voltage Vout2.

The first output voltage Vout1 and the second output voltage Vout2 become the voltages higher than the input voltage Vin by the operations of the inductor L, the first switch SW1, the second switch SW2, the third switch SW3 and the oscillator OSC that controls opening/closing of the switches. The first output voltage Vout1 is smoothed by the condenser Cout1, and supplied to the first load 3. The secondary battery 4 is connected to the second output terminal 13. The secondary battery 4 is charged by the second output voltage Vout2 from the second output terminal 13.

In this manner, the DC-DC converter 1 related to the first embodiment converts the input voltage Vin into a predetermined voltage, and outputs the converted voltage to a supply destination, such as the load and the secondary battery 4. Note that, in FIG. 1, it is assumed that the DC-DC converter 1 is connected to the thermoelectric power generation element 2 via the input terminal 11, the first load 3 via the first output terminal 12 and the secondary battery 4 via the second output terminal 13, as an example; however, the configuration of the connection destinations is not limited thereto.

The one end of the inductor L is connected to the input terminal 11, and the other end (one side terminal LX) is connected to the first switch SW1, the second switch SW2 and the third switch SW3. The inductor L converts the input voltage Vin into the first output voltage Vout1 or the second output voltage Vout2 by opening/closing of the first switch SW1, the second switch SW2 and the third switch SW3.

The current detection circuits ID1 and ID2 are respectively connected to ends of the second switch SW2 and the third switch SW3, which are not connected to the inductor L. To prevent the backflow of the current, the current detection circuit ID1 outputs "High" when the current flowing through the second switch SW2 has a positive value in the direction of the output terminal side, and outputs "Low" when the current value is 0 or less. Similarly, the current detection circuit ID2 outputs "High" when the current flowing through the third switch SW3 has a positive value in the direction of the output terminal side, and outputs "Low" when the current value is 0 or less.

The condenser Cout1 is connected to the other end of the current detection circuit ID1, which is not connected to the second switch SW2. The condenser Cout1 smooths the first output voltage Vout1 and supplies thereof to the first load 3.

The controller 14 is configured to control switching of the first switch SW1, the second switch SW2 and the third switch SW3. The comparator CMP1 of the controller 14 compares the first output voltage Vout1 with a first reference voltage Vref1 from the inside of the controller 14. This is because the output destination is switched based on a magnitude relationship between the first output voltage Vout1 and a predetermined reference value, while regarding the first reference voltage Vref1 as the reference value. In the example shown in FIG. 1, the output signal from the comparator CMP1 is branched into two, and one of them is inverted by the inverter. This generates a state in which one of the second switch SW2 and the third switch SW3 is on and the other one is off under predetermined conditions.

The oscillator OSC of the controller 14 is to control timing of switching the respective switches. Hereinafter, switching control of each switch will be described.

Regarding the first switch SW1, based on the oscillator OSC, on or off state is determined.

The state is on when the output from the oscillator OSC is "High", and is off when the output is "Low". Note that the lengths of the period during which the output from the oscillator OSC is "High" and the period during which the output from the oscillator OSC is "Low" may be the same or different.

Regarding the second switch SW2, based on the oscillator OSC, the comparator CMP1 and the current detection circuit ID1, on or off state is determined. The state is off when the output from the oscillator OSC is "High". On the other hand, even if the output from the oscillator OSC is "Low", the state does not turn on when the output from the comparator CMP1 is not "High (Vref1>Vout1)". Moreover, when the current detection circuit ID1 is "Low", that is, when the current is to flow in the direction from the first output terminal 12 side to the input terminal 11 side, the state becomes off.

Regarding the third switch SW3, based on the oscillator OSC, the comparator CMP1 and the current detection circuit ID2, on or off state is determined. The state is off whenever the output from the oscillator OSC is "High". Even if the output from the oscillator OSC is "Low", the state is changed to on only when the output from the comparator CMP1 is "Low" (Vref1<Vout1). Moreover, when the current detection circuit ID2 is "Low", that is, when the current is to flow in the direction from the second output terminal 13 side to the input terminal 11 side, the state becomes off.

Figure 2:
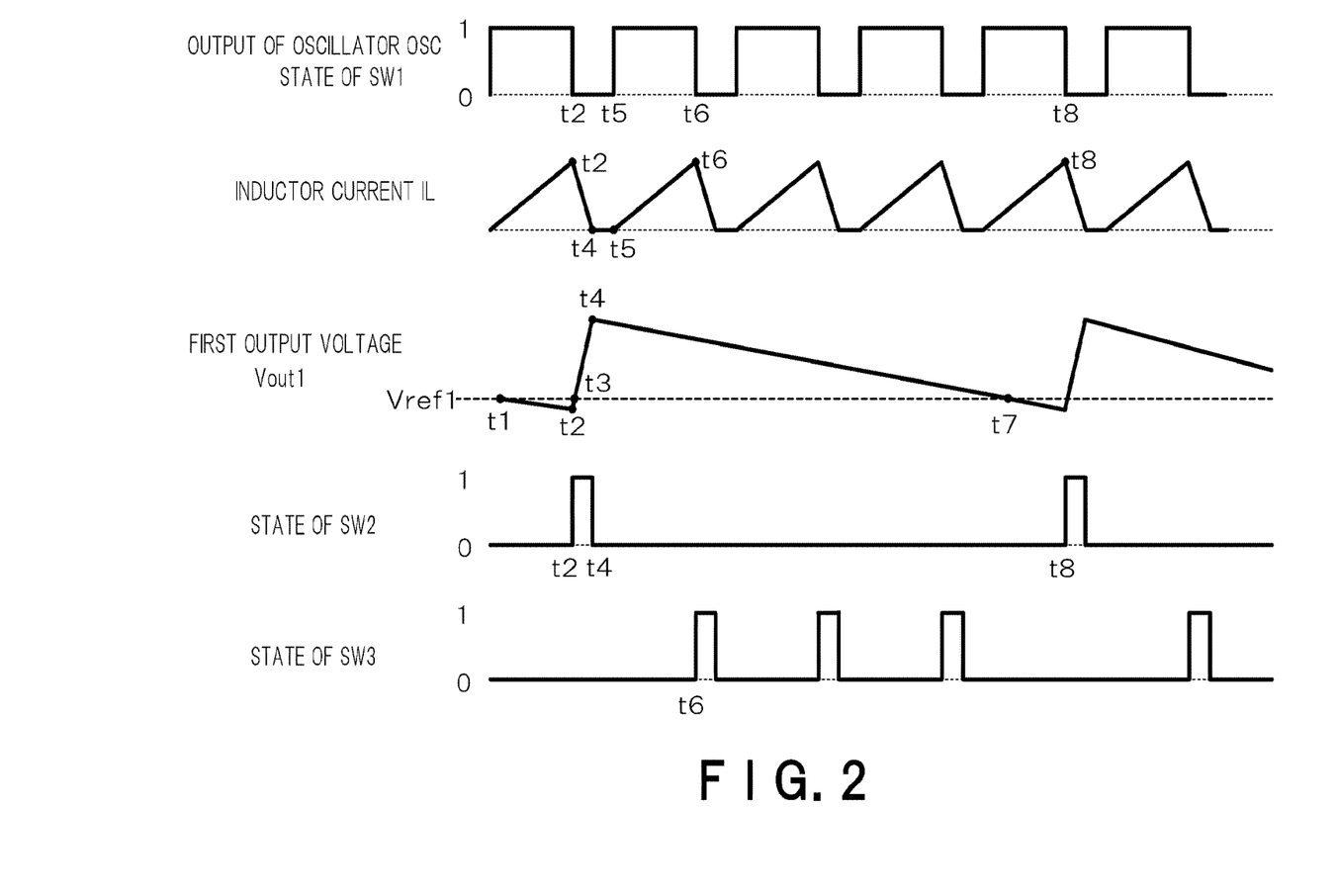
FIG. 2 is a diagram illustrating switching control in each switch related to the first embodiment.

FIG. 2 is a diagram illustrating switching control of each switch in the first embodiment. FIG. 2 shows waveforms indicating an output signal of the oscillator OSC and the state of the first switch SW1, an inductor current IL, the first output voltage Vout1, the state of the second switch SW2 and the state of the third switch SW3. As the states of the first switch SW1, the second switch SW2 and the third switch SW3, "1" indicates on, and "0" indicates off.

Since the switching of the first switch SW1 is determined based on the oscillator OSC, waveforms indicating the state of the first switch SW1 and the output signal of the oscillator OSC are the same, and are collectively shown by the uppermost waveform.

During the period in which the output from the oscillator OSC is "High", the state of the first switch SW1 is on, and both states of the second switch SW2 and the third switch SW3 are off. Therefore, in this period, the inductor current IL is increased as shown in the second waveform from the top. On the other hand, since the second switch SW2 is off, the first output voltage Vout1 is decreased in this period as shown in the third waveform from the top. Here, it is assumed that the first output voltage Vout1 falls below the first reference voltage Vref1 at the time point t1. Therefore, after the time point t1, the output from the comparator CMP1 is switched from "Low" to "High". Note that, from the acceptance of input by the comparator CMP1 to the switching of output, it is assumed that there is a time lag.

Then, at the time point t2 after the time point t1, when the oscillator OSC comes to output "Low", the first switch SW1 is turned off, and the second switch SW2 is turned on because the output from the comparator CMP1 is "High". The third switch SW3 stays off. Consequently, the inductor current IL flows into the first load 3, and the first output voltage Vout1 is increased. Conversely, the inductor current IL is decreased, and when the current stops flowing, the output of the current detection circuit ID1 is switched to "Low". Therefore, since the second switch SW2 is off, the current from the first output terminal 12 side is prevented from flowing into the inductor L.

It is assumed that the first output voltage Vout1 exceeds the first reference voltage Vref1 at the time point t3.

When the first output voltage Vout1 exceeds the first reference voltage Vref1, the output from the comparator CMP1 is switched to "Low". However, there is a time lag between the time point when the first output voltage Vout1 exceeds the first reference voltage Vref1 and the time point when the output from the comparator CMP1 is switched to "Low". The time lag is adjusted so that the inductor current IL becomes 0 (zero) before the output of the comparator CMP1 is switched to "Low". At the time point t4 when the inductor current stops flowing, the second switch SW2 is turned off.

After the time point t4, when the output of the oscillator OSC becomes "High" at the time point t5, the inductor current IL is increased because the first switch SW1 is turned on and the second switch SW2 and the third switch SW3 stay off. Then, at the time point t6 when the first switch SW1 is turned off next time, it is assumed that the first output voltage Vout1 is still higher than the first reference voltage Vref1. In this assumption, the output of the comparator CMP1 stays "Low". Accordingly, at the time point t6, the third switch SW3, not the second switch SW2, is turned on. Therefore, the inductor current IL flows into the second output terminal 13, and thereby the secondary battery 4 is charged. In due course, when the inductor current IL is decreased and stops flowing, the output of the current detection circuit ID2 is switched to "Low". Since this causes the third switch SW3 to be off, the current from the second output terminal 13 side is prevented from flowing into the inductor L.

After the time point t4, the first output voltage Vout1 is decreased due to the current flowing into the first load 3; however, the second switch SW2 is not turned on until the first output voltage Vout1 falls below the first reference voltage Vref1, and switching of the third switch SW3 and the switching of the first switch SW1 are repeated. Then, after the time point t7 when the first output voltage Vout1 falls below the first reference voltage Vref1 again, the second switch SW2 is turned on at the time point t8 when the first switch SW1 is turned off.

Note that, in FIG. 2, since the first output voltage Vout1 exceeded the first reference voltage Vref1 at the time point t6, the second switch SW2 is not turned on and the third switch SW3 is turned on at the time point t6. However, when the first output voltage Vout1 does not exceed the first reference voltage Vref1 at the time point t6 due to small increasing rate of the first output voltage Vout1 or the like, there is possibly a case in which the second switch SW2 is turned on again. In this manner, based on the magnitude relationship between the first output voltage Vout1 and the first reference voltage Vref1, on or off of the second switch SW2 and the third switch SW3 is determined.

As described above, in the first embodiment, when a voltage in one of the multiple output destinations is decreased and falls to or below a reference voltage as a threshold value, control is performed to turn on the switch for the output destination, and turn off the switches for all other output destinations. This makes it possible to determine the output destinations based on results of comparison with the reference voltage, not to control the output destination by a predetermined time allocation. Therefore, it is possible to deal with a case in which the output voltage is decreased without waiting time existing in a case in which the output destinations are determined according to a predetermined order. Moreover, when the output to be given priority is decreased, it is possible to perform output to the output destination to be given priority without performing output to other output destinations until the output exceeds the threshold value.

Second Embodiment

Figure 3:
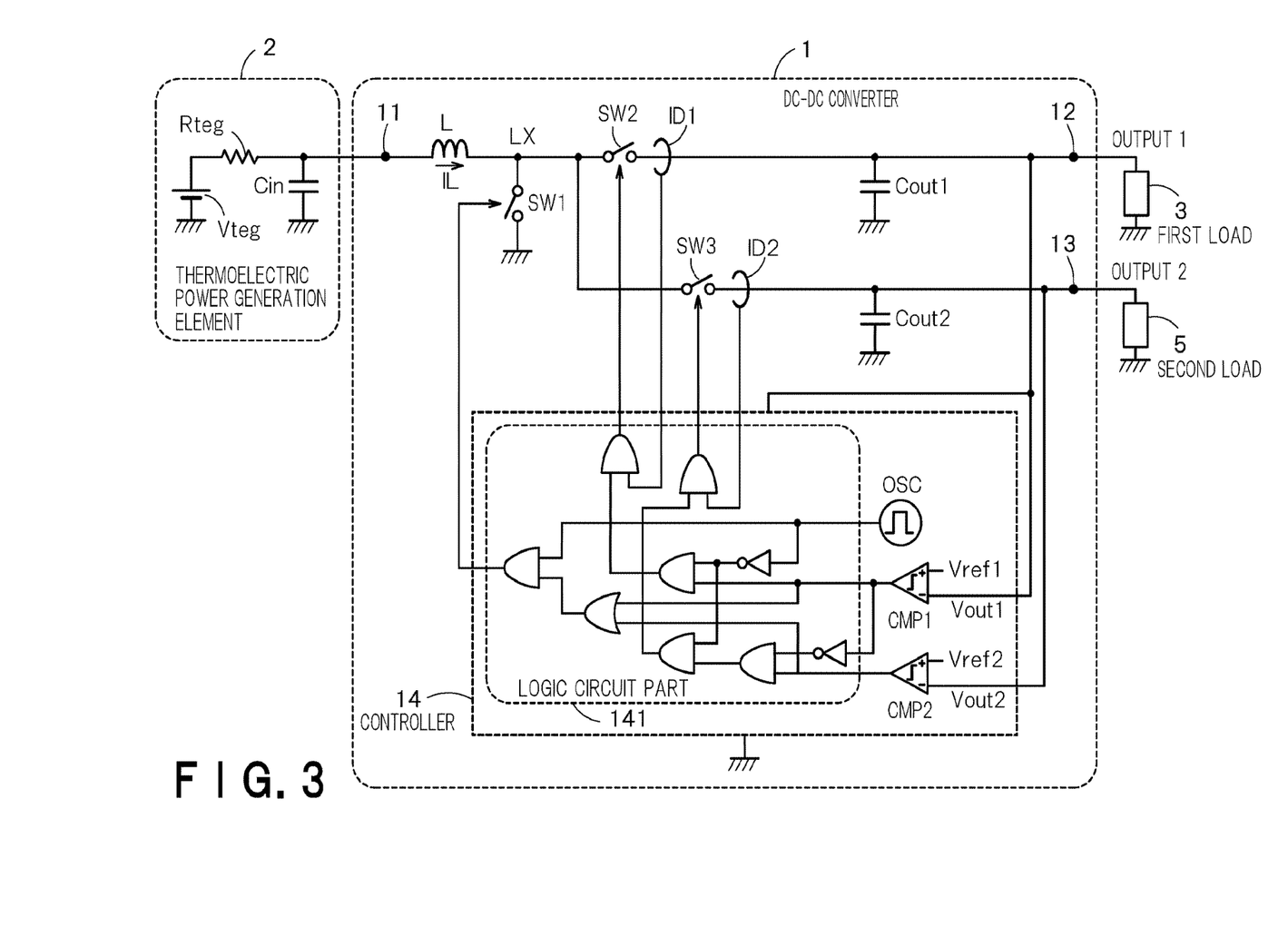
FIG. 3 is a diagram showing an example of a circuit configuration including a DC-DC converter related to a second embodiment.

FIG. 3 is a diagram showing an example of a circuit configuration including a DC-DC converter related to the second embodiment. The controller 14 and the portions related to the second output terminal 13 in the second embodiment are different from those in the first embodiment. Description of matters similar to those in the first embodiment will be omitted.

A second load 5, not the secondary battery 4, is connected to the second output terminal 13 in the second embodiment. Moreover, a second condenser Cout2 is provided between the current detection circuit ID2 and the second output terminal 13, to thereby aim to smooth a second output voltage Vout2 related to the second output terminal 13.

The controller 14 of the second embodiment further includes a comparator CMP2. The comparator CMP2 compares the second output voltage Vout2 with a second reference voltage Vref2, and outputs "High" when the second reference voltage Vref2 is higher than the second output voltage Vout2 (Vref2>Vout2), and outputs "Low" when the second reference voltage Vref2 is lower than the second output voltage Vout2 (Vref2<Vout2). Thereby, not only the first output voltage Vout1 but also the second output voltage Vout2 can be monitored. Note that the first reference voltage Vref1 and the second reference voltage Vref2 are determined by voltage values to be supplied to the first load 3 and the second load 5, respectively.

The controller 14 is configured such that the output from the oscillator OSC is not input to the first switch SW1 when both comparators CMP1 and CMP2 output "Low" (Vref1<Vout1 and Vref2<Vout2). In FIG. 3, the above configuration is achieved by an OR circuit and an AND circuit. The OR circuit outputs "Low" only when both comparators CMP1 and CMP2 output "Low". The AND circuit outputs "Low" regardless of the output from the oscillator OSC when the output from the OR circuit is "Low". Note that the embodiment is not limited to the configuration in FIG. 3.

In this manner, when the first output voltage Vout1 and the second output voltage Vout2 are high, the power consumption can be reduced by suspending switching of the first switch SW1. Moreover, when both of the second switch SW2 and the third switch SW3 are off, if switching of the first switch SW1 is carried out, the voltage of the one side terminal LX of the inductor L becomes high because there is no flowing destination of the inductor current. However, in the embodiment, when both of the second switch SW2 and the third switch SW3 are off, the first switch SW1 is prevented from being switched, and thereby high voltage in the one side terminal LX can be prevented.

Moreover, in the second embodiment, it is assumed that the first output voltage Vout1 is used for the power source for the controller 14. Moreover, in this case, when control is performed to make the first output voltage Vout1 lower than the second output voltage Vout2 (Vout1<Vout2), it is possible to suppress power consumed in the controller 14, and accordingly, efficiency of the DC-DC converter 1 can be improved. To make the first output voltage Vout1 lower than the second output voltage Vout2 (Vout1<Vout2), for example, the first reference voltage Vref1 may be set lower than the second reference voltage Vref2.

Next, switching control of each switch will be described.

Regarding the first switch SW1, different from the first embodiment, on or off state is determined based not only on the oscillator OSC, but also on the oscillator OSC, the comparator CMP1 and the comparator CMP2. When the output from the oscillator OSC is "Low", the first switch SW1 is off; however, when the output from the oscillator OSC is "High", the first switch SW1 is not necessarily on. When the output from the oscillator OSC is "High" and when the output from the comparator CMP1 or the comparator CMP2 is "High", the first switch SW1 is turned on.

Regarding the second switch SW2, similar to the first embodiment, based on the oscillator OSC, the comparator CMP1 and the current detection circuit ID1, on or off state is determined. The state is off whenever the output from the oscillator OSC is "High". Even if the output from the oscillator OSC is "Low", the state is not changed to on when the output from the comparator CMP1 is "Low" (Vref1<Vout1). Moreover, when the current detection circuit ID1 is "Low", that is, when the current is to flow in the direction from the first output terminal 12 side to the input terminal 11 side, the state also becomes off.

Regarding the third switch SW3, different from the first embodiment, based on the oscillator OSC, the comparators CM P1, CMP2 and the current detection circuit ID2, on or off state is determined. The state is off when the output from the oscillator OSC is "High". Even if the output from the oscillator OSC is "Low", the state is changed to on only when the output from the comparator CMP1 is "Low" (Vref1<Vout1) and the output from the comparator CMP2 is "High" (Vref2>Vout2). In other words, here, the second switch SW2 is given priority over the third switch SW3. Moreover, when the current detection circuit ID2 is "Low", that is, when the current is to flow in the direction from the second output terminal 13 side to the input terminal 11 side, the state becomes off.

Figure 4:
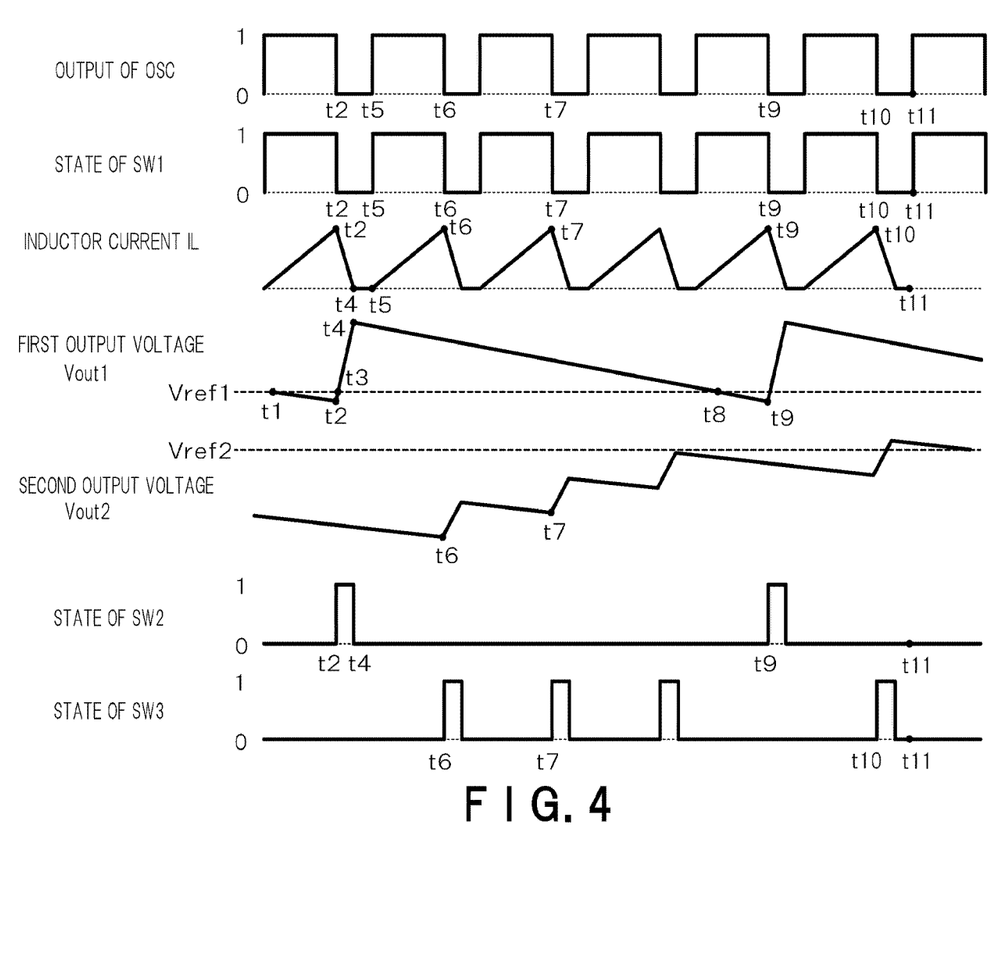
FIG. 4 is a diagram illustrating switching control in each switch related to the second embodiment.

FIG. 4 is a diagram illustrating switching control of each switch in the second embodiment.

FIG. 4 shows waveforms indicating an output signal of the oscillator OSC, the state of the first switch SW1, an inductor current IL, the first output voltage Vout1, the second output voltage Vout2, the state of the second switch SW2 and the state of the third switch SW3.

As shown in FIG. 4, it is assumed that the first output voltage Vout1 falls below the first reference voltage Vref1 at the time point t1. Until the subsequent time point t2, the output from the comparator CMP1 is "High" and both outputs from the comparators CMP1 and CMP2 are not "Low"; therefore, the output from the oscillator OSC is input to the first switch SW1. This causes the first switch SW1 to be on. Then, similar to the first embodiment, during the period in which the first switch SW1 is on, the inductor current IL is increased.

After the output from the oscillator OSC is inverted into "Low" at the time point t2, the first switch SW1 is turned off. Moreover, since the output from the comparator CMP1 is "High", the second switch SW2 is turned on. Consequently, similar to the first embodiment, the inductor current IL is gradually decreased. Meanwhile, the first output voltage Vout1 is increased.

Moreover, similar to the first embodiment, even though the first output voltage Vout1 exceeds the first reference voltage Vref1 (Vout1>Vref1) at the time point t3, the output from the comparator CMP1 is not immediately switched from "High" to "Low", and the second switch SW2 is turned off at the time point t4 when the inductor current IL becomes 0 (zero).

Moreover, as shown in FIG. 4, it is assumed that the second output voltage Vout2 is lower than the second reference voltage Vref2 (Vout2<Vref2) after the time point t4. Since the output from the comparator CMP2 is "High" in the assumption, the output from the oscillator OSC is input to the first switch SW1; accordingly, the first switch SW1 is turned on at the time point t5 when the output from the oscillator OSC becomes "High". Then, at the time point t6 when the output from the oscillator OSC is inverted into "Low", the input in the third switch SW3 becomes "High" and the third switch SW3 is turned on. The inductor current IL flows into the second output terminal 13 via the third switch SW3, and the second output voltage Vout2 is increased. In due course, when the inductor current IL is decreased and becomes 0, the output of the current detection circuit ID2 is switched to "Low" and the third switch SW3 is turned off.

As shown in FIG. 4, when the second output voltage Vout2 does not exceed the second reference voltage Vref2 regardless of turning on of the third switch SW3 for the first time and the first output voltage Vout1 is equal to the first reference voltage Vref1, the third switch SW3 is also turned on at the time point t7 when the output from the oscillator OSC becomes "Low". In this manner, there is a possibility that switching of the third switch SW3, namely, the output to the second load 5 is repeated. Note that, during the period in which the output to the second load 5 is repeated, since the second switch SW2 is not turned on and the power is not supplied, the first output voltage Vout1 is continuously decreased.

When the first output voltage Vout1 falls below the first reference voltage Vref1 (Vout1<Vref1) again at the time point t8 due to the decrease of the first output voltage Vout1, the output from the comparator CMP2 is switched to "High", and the second switch SW2 is preferentially turned on at the time point t9 when the output from the oscillator OSC becomes "Low". At this time, the third switch SW3 is off regardless the relationship between the second output voltage Vout2 and the second reference voltage Vref2.

Since the first output voltage Vout1 has exceeded the first reference voltage Vref1 due to turning on of the second switch SW2 at the time point t9, the third switch SW3 is turned on at the time point t10 when the output from the oscillator OSC becomes "High" next time. Then, at the time point t11, which is a further next timing when the output from the oscillator OSC becomes "High", since the first output voltage Vout1 is higher than the first reference voltage Vref1 and the second output voltage Vout2 is higher than the second reference voltage Vref2 (Vout1>Vref1 and Vout2>Vref2), both comparators CMP1 and CMP2 output "Low". Consequently, at the time point t11, the first switch SW1 is not turned on; therefore, all of the switches are off. Moreover, suspension of switching is continued until the first output voltage Vout1 falls below the first reference voltage Vref1 (Vout1<Vref1) or the second output voltage Vout2 falls below the second reference voltage Vref2 (Vout2<Vref2).

As described above, in the second embodiment, one of the outputs is used as the power source for the control circuit of the converter itself. Then, when the voltage serving as the power source becomes a threshold value or less, a switch through which the output goes is turned on and all other switches through which the outputs go are turned off, to thereby perform output preferentially to the power source for the control circuit. Consequently, when the power source voltage of the controller 14 is decreased, it is possible to preferentially recover the voltage; accordingly, the DC-DC converter 1 is less likely to be suspended, and operated stably. Moreover, by setting the first output voltage Vout1 lower than the second output voltage Vout2, it is possible to reduce the power consumption in the controller 14, and accordingly, efficiency of the DC-DC converter 1 can be improved.

Third Embodiment

Figure 5:
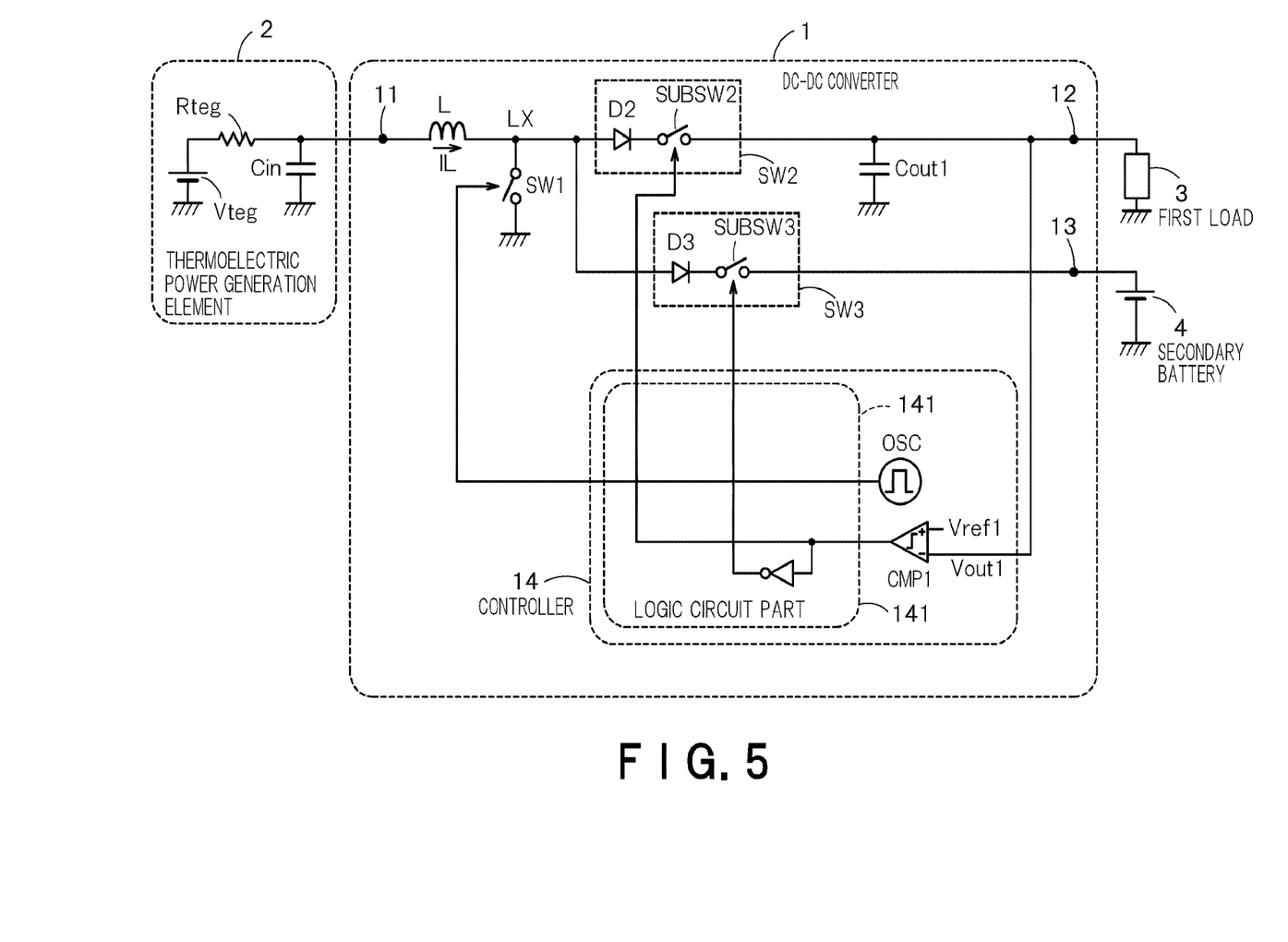
FIG. 5 is a diagram showing an example of a circuit configuration including a DC-DC converter related to a third embodiment.

FIG. 5 is a diagram showing an example of a circuit configuration including a DC-DC converter related to the third embodiment. Description will be given of matters different from the first embodiment, and description of matters similar to those in the first embodiment will be omitted.

The second switch SW2 of the third embodiment includes a diode D2 and a sub-switch SubSW2. Moreover, the third switch SW3 includes a diode D3 and a sub-switch SubSW3.

The control signals for the second switch SW2 and the third switch SW3 are also different from those in the first embodiment. The controller 14 in the third embodiment outputs a comparison result of the comparator CMP1 to the sub-switch SubSW2 without synthesizing the signal of the oscillator OSC. Moreover, the controller 14 inverts the comparison result of the comparator CMP1 and outputs to the sub-switch SubSW3. Therefore, in the above-described embodiments, during the period in which the first switch SW1 is on, the other switches are not subjected to switching; however, in the third embodiment, even during the period in which the first switch SW1 is on, the other switches are subjected to switching at the time point when the output from the comparator CMP1 is switched.

Moreover, the third embodiment does not include the current detection circuits ID1 and ID2 connected to the second switch SW2 and the third switch SW3 respectively.

Figure 6:
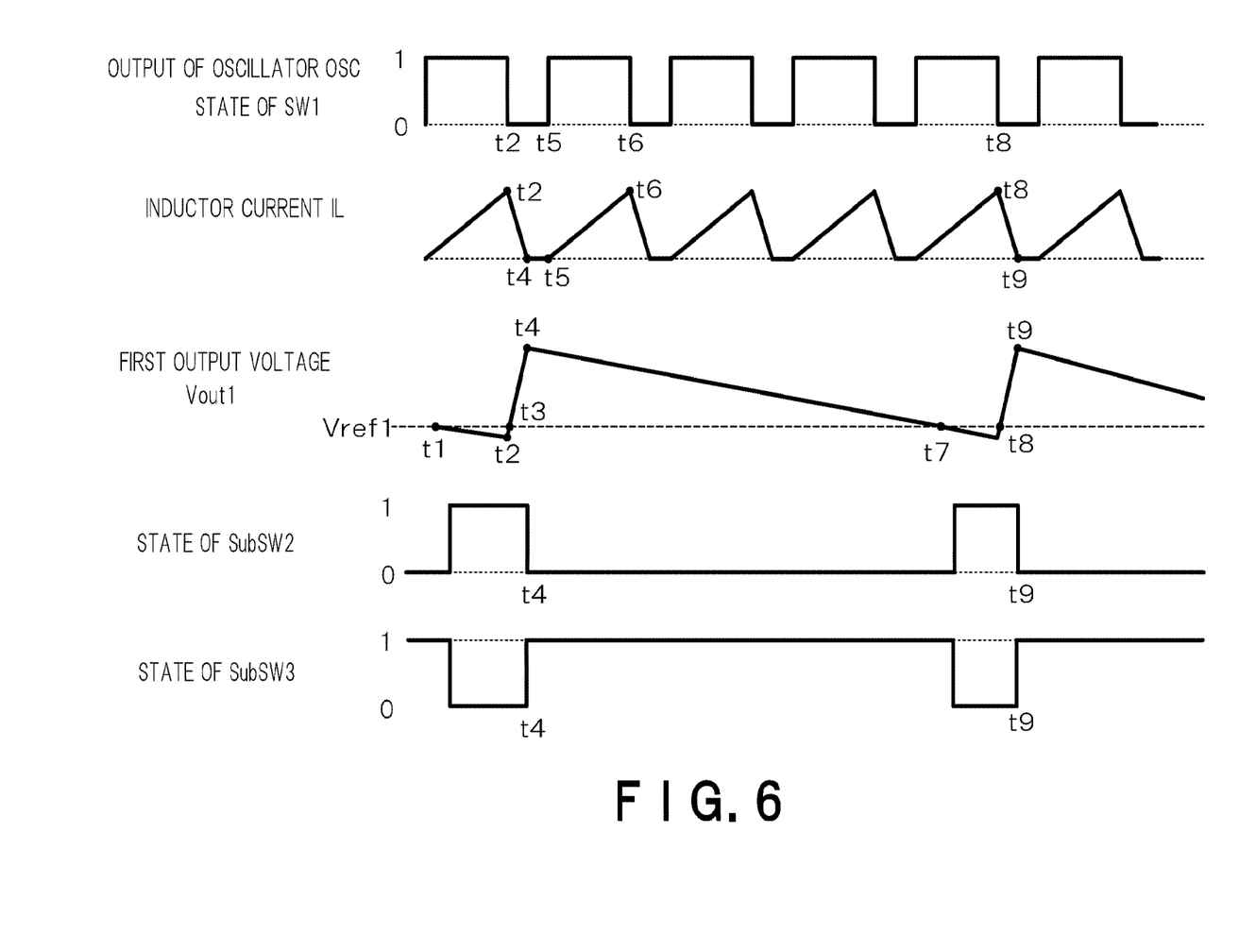
FIG. 6 is a diagram illustrating switching control in each switch related to the third embodiment.

FIG. 6 is a diagram illustrating switching control of each switch in the third embodiment.

FIG. 6 shows waveforms of the output signal of the oscillator OSC and the state of the first switch SW1, the inductor current IL, the first output voltage Vout1, the state of the sub-switch SubSW2 and the state of the sub-switch SubSW3.

When the output from the oscillator OSC is "High", the first switch SW1 is on, and therefore, the inductor current IL is increased, but the first output voltage Vout1 is decreased. When the first output voltage Vout1 falls below the first reference voltage Vref1 at the time point t1, thereafter, the output of the comparator CMP1 is switched from "Low" to "High", and the sub-switch SubSW2 is turned on and the sub-switch SubSW3 is turned off.

At this time, though the first switch SW1 is on, the inductor current IL is continuously increased because of a reverse bias of the diode D2.

When the output from the oscillator OSC is switched to "Low" at the time point t2, the first switch SW1 is turned off, and the voltage of a terminal LX of the inductor L is increased until the diode D2 of the second switch SW2 is electrically conducted. When the diode D2 is forward biased, the inductor current IL flows through the diode D2 and the sub-switch SubSW2, and thereby the first output voltage Vout1 is increased. At this time, the inductor current IL is decreased, but the current does not flow toward the input terminal 11 side because of the diode D2.

When the first output voltage Vout1 exceeds the first reference voltage Vref1 at the time point t3, the output of the comparator CMP1 is switched to "Low", and the sub-switch SubSW2 is turned off and the sub-switch SubSW3 is turned on. However, due to the time lag in the comparator CMP1, it is assumed that the sub-switch SubSW2 and the sub-switch SubSW3 are switched at the time point t4. After the time point t4, the first output voltage Vout1 is gradually decreased.

At the subsequent time point t5, when the output from the oscillator OSC is switched to "High", the inductor current IL is increased. When the output from the oscillator OSC is switched to "Low" at the subsequent time point t6, the first switch SW1 is turned off, and the voltage of the terminal LX is increased until a diode D3 of the third switch SW3 is electrically conducted. When the diode D3 is forward biased, the inductor current IL flows through the diode D3 and the sub-switch SubSW3, and the secondary battery 4 connected to the second output terminal 13 is charged. At this time, the inductor current IL is decreased, but the current does not flow toward the input terminal 11 side because of the diode D3.

Charging of the secondary battery 4 connected to the second output terminal 13 is repeated until the first output voltage Vout1 falls below the first reference voltage Vref1. Moreover, since the second switch SW2 is not turned on and the power is not supplied, the first output voltage Vout1 is continuously decreased. When the first output voltage Vout1 falls below the first reference voltage Vref1 again at the time point t7, the sub-switch SubSW2 is turned on and the sub-switch SubSW3 is turned off, and thereafter, the first output voltage Vout1 is increased.

In the above embodiments, to prevent the backflow of the current, the second switch SW2 or the third switch SW3 must be turned off based on the inductor current IL. However, in the embodiment, as shown in FIG. 6, it is unnecessary to turn off the switch unless the output destination is switched.

As described above, in the third embodiment, the backflow of the current into the second switch SW2 and the third switch SW3 is prevented by use of the diodes. Consequently, there is no need to provide a circuit to prevent or detect the backflow separately, and moreover, the control circuit can be simplified.

Fourth Embodiment

Figure 7:
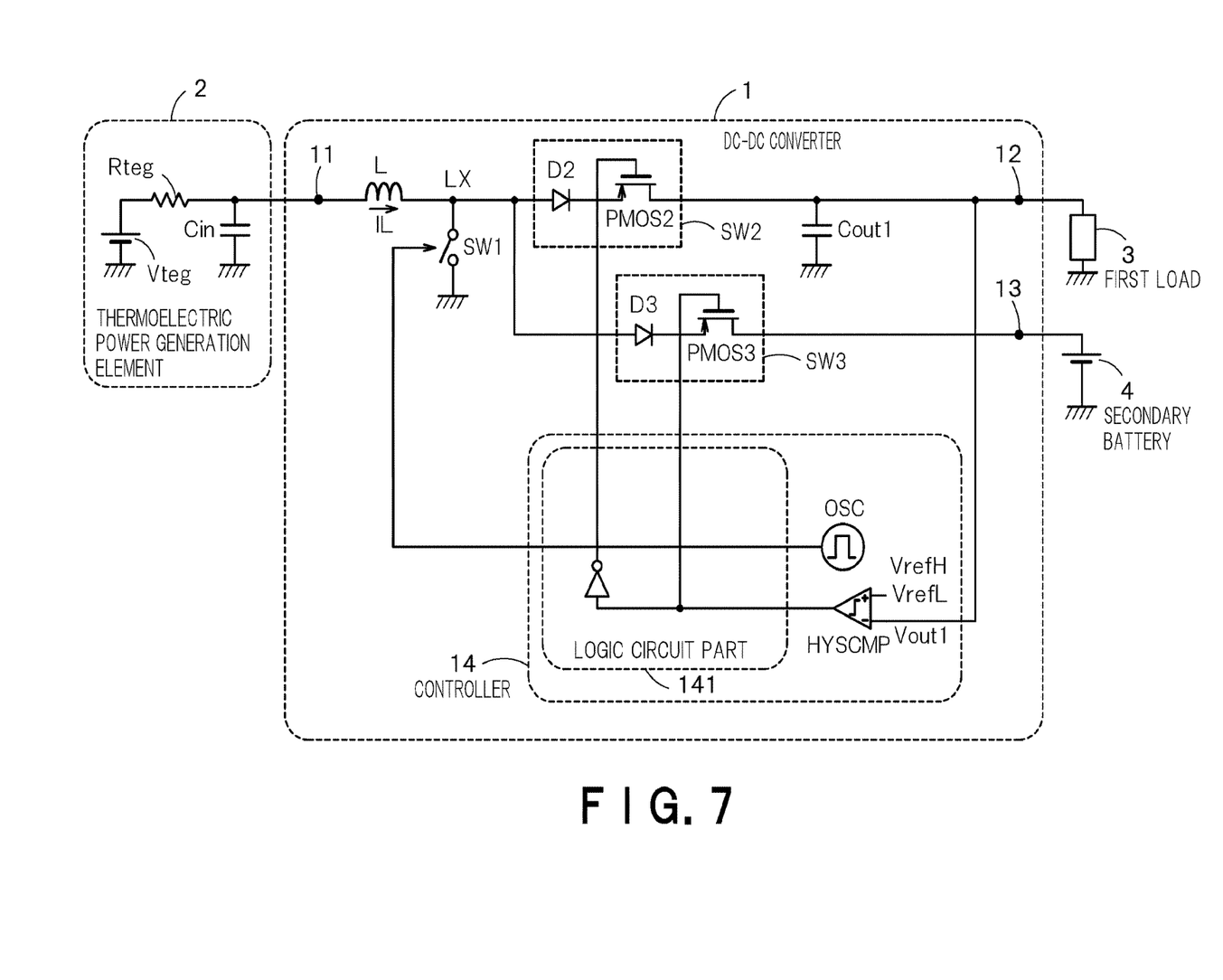
FIG. 7 is a diagram showing an example of a circuit configuration including a DC-DC converter related to a fourth embodiment.

FIG. 7 is a diagram showing an example of a circuit configuration including a DC-DC converter related to the fourth embodiment. Description will be given of matters different from the third embodiment, and description of matters similar to those in the third embodiment will be omitted.

In the fourth embodiment, the comparator CMP1 of the third embodiment is changed to a hysteresis comparator HYSCMP. The hysteresis comparator HYSCMP performs determination about the first output voltage Vout1 by use of a first reference value (upper limit voltage) VrefH and a second reference value (lower limit voltage) VrefL with which the expression VrefL<Vref1<VrefH holds. When the first output voltage Vout1 is higher than the upper limit voltage VrefH (Vout1>VrefH), the hysteresis comparator HYSCMP outputs "Low". When the first output voltage Vout1 is lower than the lower limit voltage (Vout1<VrefL), the hysteresis comparator HYSCMP outputs "High".

Moreover, once it is determined that the first output voltage Vout1 is lower than the lower limit voltage VrefL (Vout1<VrefL), the hysteresis comparator HYSCMP continuously outputs "High" until the first output voltage Vout1 becomes higher than the upper limit voltage VrefH (Vout1>VrefH). Once it is determined that the first output voltage Vout1 is higher than the upper limit voltage VrefH (Vout1>VrefH), the hysteresis comparator HYSCMP continuously outputs "Low" until the first output voltage Vout1 becomes lower than the lower limit voltage VrefL (Vout1<VrefL).

The second switch SW2 includes the diode D2 and a p-channel MOSFET (PMOS) 2. Moreover, the third switch SW3 includes the diode D3 and a p-channel MOSFET (PMOS) 3. The PMOS 2 and the PMOS 3 are turned on when "Low" signals are input to the gates, and are turned off when "High" signals are input to the gates. When the gate signals of the PMOS 2 and the PMOS 3 are switched, charging or discharging of the gate capacitance is performed, and thereby electric power is consumed.

Figure 8A:
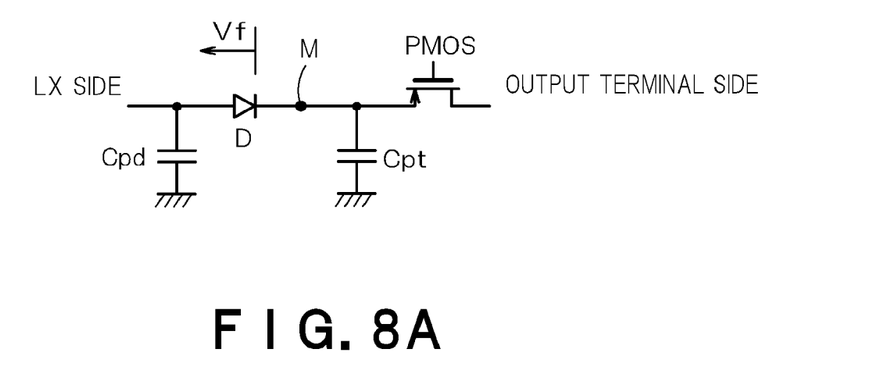
FIGS. 8A and 8B are diagrams showing examples of connection configuration between a diode and a p-channel MOSFET.
Figure 8B:
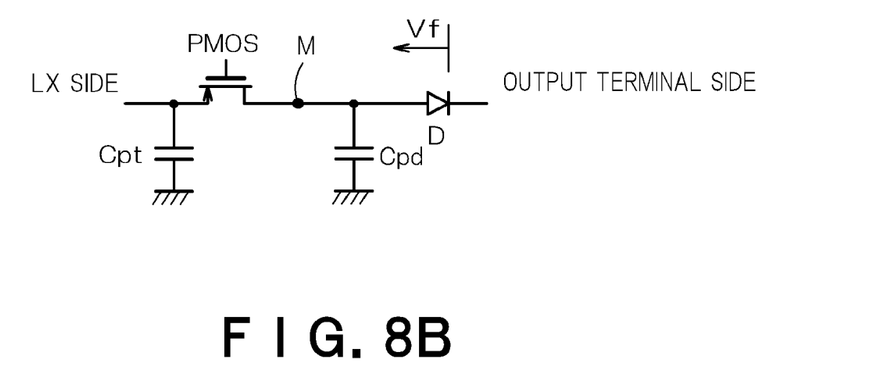

FIGS. 8A and 8B are diagrams showing examples of connection configuration between the diode and the PMOS. In FIGS. 8A and 8B, a parasitic capacitance of the diode is represented as Cpd, and a parasitic capacitance of the PMOS is represented as Cpt. In FIG. 8A, the inductor terminal LX and the diode are connected, and the PMOS is connected to somewhere between the diode and the output terminal 12 or the output terminal 13. In FIG. 8B, the order is reversed; the inductor terminal LX and the PMOS are connected, and the diode is connected to somewhere between the PMOS and the output terminal 12 or the output terminal 13.

To reduce on-resistance, the large-sized PMOS is used. Meanwhile, the resistance value of the diode is less dependent to the size. Therefore, in general, the expression Cpd<Cpt holds.

When the parasitic capacitance exists on the inductor terminal LX side, electric charge is accumulated while the first switch SW1 is off, and thereby a backflow current returning to the inductor L side is generated. In FIG. 8A, the value of Cpd is smaller than the value of Cpt, and the backflow current caused by the Cpt is prevented by the diode. Meanwhile, in FIG. 8B, both the backflow current caused by Cpd and the backflow current caused by Cpt flow into the inductor L. Consequently, from the standpoint of preventing the backflow current, the arrangement in FIG. 8A is better than the arrangement in FIG. 8B.

Moreover, in the diode, a forward voltage drop Vf is caused while the current is flowing. When the on-resistance is small, a drain-source potential difference in the PMOS is negligibly small as compared to the voltage drop Vf. Therefore, the potential at the connection point M between the diode and the PMOS in the arrangement in FIG. 8A is almost equal to the output voltage Vout. Meanwhile, the potential at the connection point M between the diode and the PMOS in the arrangement in FIG. 8B is the sum of the output voltage Vout and the voltage drop Vf. In the PMOS, when the potential of the drain terminal or the source terminal is increased, the gate potential required to turn off the PMOS is also increased. Consequently, in the arrangement in FIG. 8B, it is difficult to turn off the PMOS, and thereby a leakage current is likely to be caused.

From the above, in the second switch SW2 and the third switch SW3, the configuration disposing the diode with the relatively small parasitic capacitance on the inductor terminal LX side and disposing the PMOS on the output terminal side is effective in preventing the backflow current and suppressing the leakage current.

Figure 9:
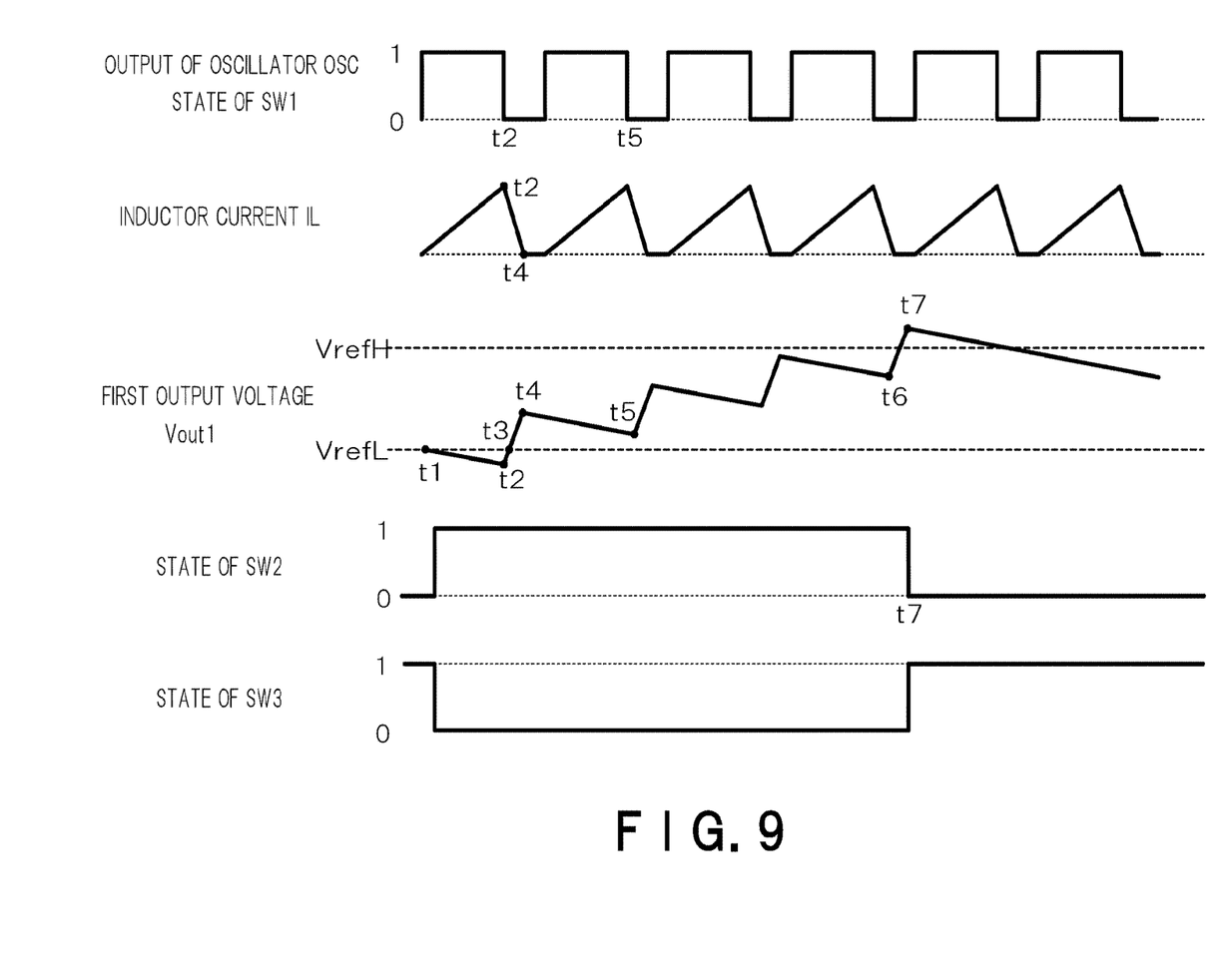
FIG. 9 is a diagram illustrating switching control in each switch related to the fourth embodiment.

FIG. 9 is a diagram illustrating switching control of each switch in the fourth embodiment.

In FIG. 9, waveforms of an output signal of the oscillator OSC and the state of the first switch SW1, an inductor current IL, the first output voltage Vout1, the state of the second switch SW2 and the state of the third switch SW3 are shown.

When the first output voltage Vout1 falls below the lower limit voltage VrefL at the time point t1, thereafter, the output from the hysteresis comparator HYSCMP is switched to "High". To the gate of the PMOS 2, "Low" is input because the output of the hysteresis comparator HYSCMP is inverted to be input. Since the PMOS 2 is turned on when "Low" is input to the gate thereof, the second switch SW2 is switched from off to on. Meanwhile, "High" is input to the gate of the PMOS 3. Since the PMOS 3 is turned off when "High" is input to the gate thereof, the third switch SW3 is switched from on to off.

When the output of the oscillator OSC is "High", the first switch is on and the diode D2 is reverse biased. Therefore, the current does not flow toward the output terminal side, and the inductor current IL is continuously increased. When the output from the oscillator OSC is switched to "Low" at the time point t2, the first switch SW1 is turned off, and the voltage of the inductor terminal LX is increased until the diode D2 is electrically conducted. When the diode D2 is forward biased, the inductor current IL flows through the diode D2 and the PMOS 2, and thereby the first output voltage Vout1 is increased. Consequently, the inductor current IL is adversely decreased, but the current does not turn to be negative and does not flow back because of the diode D2.

Moreover, due to hysteresis characteristics of the hysteresis comparator HYSCMP, even though the first output voltage Vout1 exceeds the lower limit voltage VrefL at the time point t3, the output from the hysteresis comparator HYSCMP is not switched to "Low". Therefore, until the first output voltage Vout1 exceeds the upper limit voltage VrefH, the states of the second switch SW2 and the third switch SW3 are not changed. Moreover, when the inductor current IL stops flowing at the time point t4, the first output voltage Vout1 is decreased; however, when the first switch SW1 is turned from on to off again at the time point t5, the first output voltage Vout1 is increased. In this way, the first output voltage Vout1 is increased in a phased manner.

When the first output voltage Vout1 exceeds the upper limit voltage VrefH at the time point t6, at the subsequent time point t7, the output from the hysteresis comparator HYSCMP is switched to "Low", the second switch SW2 is turned off, and the third switch SW3 is turned on. When the output of the oscillator OSC is "High", as described above, the first switch SW1 is on; accordingly, the current does not flow toward the output terminal side, and the inductor current IL is increased. When the output from the oscillator OSC is switched to "Low", the first switch SW1 is turned off, and the voltage of the terminal LX is increased until the diode D3 is electrically conducted. When the diode D3 is forward biased, the inductor current IL flows through the diode D3 and the PMOS 3, and the secondary battery 4 connected to the output terminal 13 is charged. Consequently, the inductor current IL is decreased, but the current does not flows toward the input terminal 11 side because of the diode D3. In this period, there is no power supply to the output terminal 12 side, and accordingly, the first output voltage Vout1 is decreased.

Even after the first output voltage Vout1 falls below the upper limit voltage VrefH due to the hysteresis characteristics of the hysteresis comparator HYSCMP, the secondary battery 4 connected to the second output terminal 13 is charged since the output from the hysteresis comparator HYSCMP is not switched to "High" until the first output voltage Vout1 falls below the lower limit voltage VrefL. Then, when the first output voltage Vout1 falls below the lower limit voltage VrefL, the output from the hysteresis comparator HYSCMP is switched to "High", to thereby start outputting to the first output terminal 12.

As described above, by use of the hysteresis comparator, the first output voltage Vout1 remains in the vicinity of a region from the lower limit voltage VrefL to the upper limit voltage VrefH. Consequently, effects, such as reduction of power consumption due to decrease in the number of times of switching the output from the comparators, and reduction of power consumption in charging or discharging of gate capacitance by decrease in the number of times of opening/closing of the PMOS 2 and the PMOS 3, can be obtained. Moreover, regarding the positional relationship between the diode and the PMOS, by disposing the diode to the inductor L side and the PMOS to the output terminal side, the effects of preventing the backflow of the current into the inductor L and suppressing the off-leakage current in the PMOS can also be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A DC-DC converter comprising:
an input terminal to which an input voltage is input;
multiple output terminals to output an output voltage;
an inductor that has one end connected to the input terminal;
a first switch configured to be subjected to on-off control at regular intervals to change a current flowing through the inductor;
a first condenser that has one end connected between the inductor and a first output terminal, which is one of the multiple output terminals, and has the other end connected to a ground;
a second switch connected between the inductor and the first condenser; and
a switch controller configured to control the second switch,
wherein
the switch controller keeps the second switch off when the first switch is turned off while a first output voltage from the first output terminal is bigger than a predetermined first threshold value, and
the switch controller turns on the second switch only when the first switch is turned off while the first output voltage is smaller than the first threshold value, so that the first output voltage returns to a value which is bigger than the first threshold value.

2. The DC-DC converter according to claim 1, further comprising:
a third switch connected between the inductor and a second output terminal, which is one of the multiple output terminals,
wherein
the third switch is off while the second switch is on, thereby preventing a current from the inductor from flowing into the second output terminal.

3. The DC-DC converter according to claim 1, wherein the inductor is connected between the input terminal and the first switch, and
one end of the first switch is connected to the other end of the inductor, and the other end of the first switch is connected to the ground.

4. The DC-DC converter according to claim 2, further comprising:
a second condenser connected between the third switch and the second output terminal,
wherein
the third switch is turned off when the first switch is turned off and the second switch is kept off while a second output voltage from the second output terminal is smaller than a predetermined second threshold value, so that the second output voltage is increased,
the third switch is kept off when the first switch is turned off and the second switch is kept off while the second output voltage is bigger than the second threshold value, so that the second output voltage returns to a value which is lower than the second threshold value.

5. The DC-DC converter according to claim 1, wherein the switch controller uses the first output voltage as a power source.

6. The DC-DC converter according to claim 4, wherein the switch controller uses the first output voltage as a power source, and the first output voltage is not more than the second output voltage.

7. The DC-DC converter according to claim 1, wherein the second switch comprises:
a rectifier part configured to allow a current in a direction from the inductor toward the first condenser to flow through, but not to allow a current in a direction from the first condenser toward the inductor to flow through.

8. The DC-DC converter according to claim 7, wherein the second switch comprises:

a diode serving as the rectifier part and having one end connected to the inductor; and a MOSFET that has one end connected to the other end of the diode, and has the other end connected to the first condenser.

9. The DC-DC converter according to claim 1, wherein
the second switch stays on until the first switch is turned off while the first output voltage is larger than a predetermined third threshold value after the second switch is turned on.

* * * * *